United States Patent [19]

Rao et al.

[11] Patent Number: 4,786,009

[45] Date of Patent: Nov. 22, 1988

[54] YAW AND PITCH CONTROL OF AIR VEHICLES AT HIGH ANGLES OF ATTACK

[75] Inventors: Dhanvada M. Rao, Hampton; Daniel G. Murri, Grafton, both of Va.

[73] Assignee: Vigyan Research Associates, Inc., Hampton, Va.

[21] Appl. No.: 453

[22] Filed: Jan. 5, 1987

[51] Int. Cl.⁴ .............................................. B64C 19/00
[52] U.S. Cl. .................................. 244/75 R; 244/213; 244/45 A; 244/91
[58] Field of Search ............... 244/213, 199, 214, 218, 244/45 R, 45 A, 49, 91, 75 R

[56] References Cited

U.S. PATENT DOCUMENTS

| | | | |
|---|---|---|---|
| 2,338,935 | 1/1944 | Hafner | 244/17.19 |
| 2,448,075 | 8/1948 | Bortner | 244/106 |
| 2,743,888 | 5/1956 | Lippisch | 244/218 |
| 4,161,300 | 7/1979 | Schwaerzler | 244/45 A |
| 4,542,866 | 9/1985 | Caldwell et al. | 244/45 A |

FOREIGN PATENT DOCUMENTS 960053  3/1957  Fed. Rep. of Germany ...... 244/199

OTHER PUBLICATIONS

Sven, "A Device for Yawing Moment Control of Aircraft", European Patent Application, EP 0209171, Jan. 1987.

Primary Examiner—Galen Barefoot
Attorney, Agent, or Firm—William H. King

[57] ABSTRACT

Method and apparatus for controlling the yaw and pitch of air vehicles at high angles of attack by controlling the vortex pattern around the forebodies of the air vehicles by means of deflecting strakes 11 and 16.

8 Claims, 3 Drawing Sheets

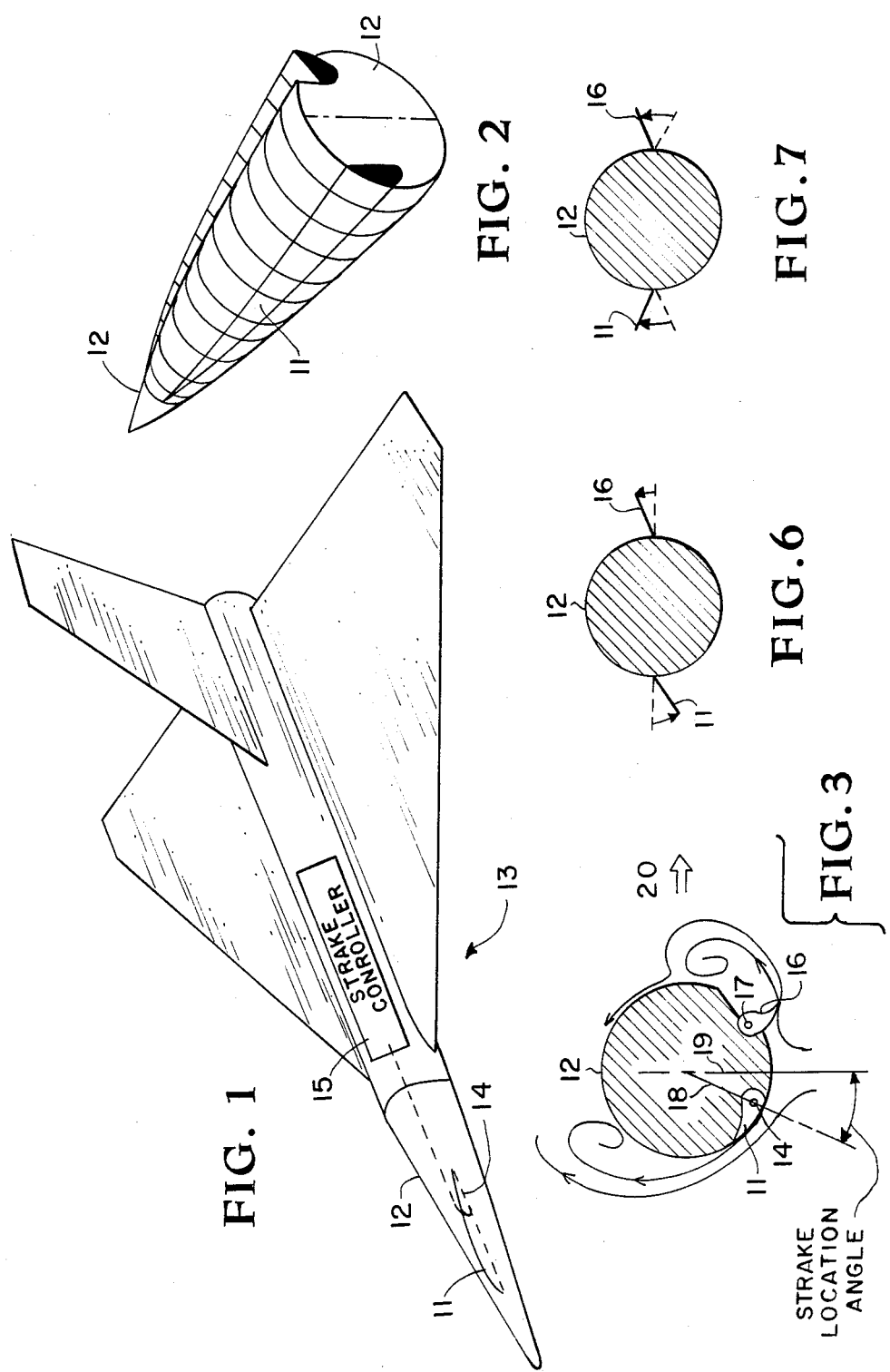

YAW AND PITCH CONTROL OF AIR VEHICLES AT HIGH ANGLES OF ATTACK

ORIGIN OF THE INVENTION

This invention was made with Government support under Contract No. NAS1-16259, awarded by the National Aeronautics and Space Administration. The Government has certain rights in this invention.

BACKGROUND OF THE INVENTION

The invntion relates generally to the control of air vehicles at high angles of attack and more specifically concerns controlling the vortex patterns around forebodies to control the yaw and pitch during high angle of attack maneuvering of air vehicles, when conventional control surfaces become ineffective due to massive flow separation on lifting surfaces.

The current trend toward enhanced post-stall maneuverability of tactical aircraft demands control capability at angles of attack well above the range of conventional aerodynamic control surfaces. A pertinent example is the aft rudder, which rapidly loses effectiveness when immersed in the low-energy separated flow from the wing, requiring consideration of alternate means of yaw control.

An approach of considerable interest is to exploit well-known vortex asymmetry occurring on pointed forebodies at high angles of attack, which usually results in sizeable side forces acting well forward of the center of gravity. The prior art has investigated the use of air injection near the forebody nose to control the vortex asymmetry. An effective yaw power was demonstrated at high angles of attack on a particular forebody whose flattened cross-section favored the generation of strong vortices; the jet injection in this concept presumably acts as a fluidic switch to control the direction and degree of vortex asymmetry.

The question arises in the use of the jet injection technique whether a comparable level of yaw power would be obtainable when the prevailing forebody vortex system was not strong (e.g., on forebodies of shorter length or those having a circular or upright oval cross-section). The jet injection technique also was found somewhat limited in terms of the linearity control and effectiveness at large sideslip angles. In addition, to ensure jet fluid supply at high angles of attack when engine bleed air cannot be relied on the jet injection technique recommended a solid propellant blowing system. Such a system, however, has inherent control complexity, duration limitations, and servicing requirements.

Narrow, sharp-edge strakes have frequently been applied to pointed slender forebodies for modifying the high-alpha vortex shedding characteristics, as a solution to the zero-sideslip asymmetric problem as well as to improve lateral-directional stability. Unfortunately, fixed strakes have shown deleterious side effects such as high-alpha pitch up, diminished yaw damping, and marked reductions in dihedral effect.

It is an object of this invention to utilize a simple technique, exploiting the vortex asymmetry occurring on pointed forebodies at high angles of attack, for controlling yaw at hight angles of attack, that does not have the complexities and disadvantages of prior techniques.

Another object of this invention is to utilize a vortex technique for controlling pitch at high angles of attack.

A further object of this invention is to utilize deflectable strakes on the forebodies of air vehicles to control yaw and pitch at high angles of attack.

Other objects and advantages of this invention will become apparent hereinafter in the specification and drawings. For example, a symmetrical pair of strakes (later disclosed) alleviates the zero-sideslip force and yawing moment from the forebody at high angles of attack.

SUMMARY OF THE INVENTION

The invention is a method and apparatus for controlng the yaw and pitch of air vehicles at high angles of attack. Two symmetrical strakes are longitudinally hinged along hinge lines near the outer surface of the forebody of an air vehicle. The strakes are symmetrically hinged on opposite sides of the forebody. A control is located on the air vehicle for controlling the deflections of the two strakes independently. When one of the strakes is deflected with the other one remaining undeflected, or when one is deflected upward and the other one is equally and simultaneously deflected downward the vortex patterns around the forebody are altered resulting in yawing moments. Also, when both strakes are equally and simultaneously deflected either upward or downward in synchronism pitching moments result.

BRIEF DESCRIPTION OF THE DRAWINGS

FIG. 1 is a drawing of the embodiment selected for illustrating the invention;

FIG. 2 is a drawing showing two strakes;

FIG. 3 is a cross-section of a forebody of an air vehicle showing strakes for generating a yaw control of the air vehicle at high angles of attack;

FIG. 6 is a schematic cross-sectional drawing of a forebody with strakes showing anti-symmetric deflections of the strakes for the purpose of controlling the yaw at high angles of attack;

FIG. 7 is a schematic cross-sectional drawing of a forebody with strakes showing symmetric deflections of the strakes for the purpose of controlling the pitch at high angles of attack.

DETAILED DESCRIPTION OF THE INVENTION

Figure 4:
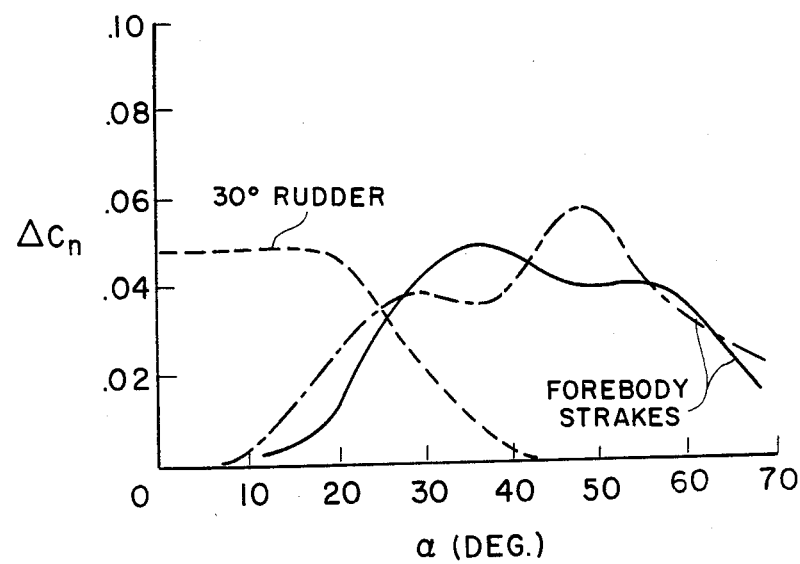
FIG. 4 is a graph demonstrating the yaw control of FIG. 3.

Turning now to the embodiment of the invention selected for illustration in the drawings the number 11 in FIG. 1 designates a strake that is attached to the forebody 12 of an air vehicle 13. Strake 11 is attached to forebody 12 by means of a hinge 14 such that strake 11 can be deflected through an angle of approximately 180 degrees. A second symmetrical strake (not shown in FIG. 1) is symmetrically attached to the opposite side of forebody 12 by means of a hinge such that the second strake can also be deflected through approximately 180 degrees. A strake controller 15 located on board air vehicle 13 controls the deflections of the two strakes. The manner in which the deflections of the two strakes are controlled will be disclosed later in the specification. Strake controller 15 can be any conventional type controller and can be operated electrically, hydraulically or pneumatically. Controls that can be used as strake controller 15 are obvious to one having ordinary skill in the art and are therefore not disclosed in detail in this specification.

In FIG. 2, a view of forebody 12 in which the left strake 11 is conformed and the right strake 16 is deployed. Strakes 11 and 16 are fitted into slots cut into the forebody.

FIG. 3 shows a cross-section of forebody 12 containing strake 11 and the second strake 16 mounted for deflection on a hinge 17. The angle that a line 18 through the center of the cross-section and perpendicular to the line of hinge 14 makes with the vertical axis 19 of the cross-section is the strake location angle. Note that hinge 16 has the same strake location angle as hinge 14 except in the opposite direction. During one mode of operation of this invention strake controller 15 deflects hinge 16 while not deflecting strake 11. This forces a stable, asymmetric vortex pattern on the forebody at high angles of attack, thereby generating a side force component 20. The side force 20 acting considerably forward of the air vehicle 13 center of gravity produces a yawing moment. Reliance on controlled asymmetry of forebody vortex separation allows this yawing moment to continue unabated to high angles of attack, unaffected by flow separation on wings and aft surfaces. Variations in the deflection of strake 16 changes the magnitude of side force 20. Deflecting strake 11 with strake 16 undeflected produces side forces in the opposite direction to that of side force 20.

The symmetric placement of strakes 11 and 16 at different strake angles on forebody 12 will produce different results. Each air vehicle that utilizes this invention should be tested at different strake location angles to determine which strake location angle produces the most desired results. A delta-wing-fuselage-vertical tail model similar to air vehicle 13 has been wind tunnel tested to determine that 60° to 120° locations of the strakes offer desirable results. The data of this test and tests of other modes of operation of this invention are disclosed in a paper AIAA-86-0333 by D. M. Rao and D. G. Murri, "Exploratory Investigation of Deflectable Forebody Strakes for High-Angle-of-Attack Yaw Control," presented at the AIAA 24th Aerospace Sciences Meeting on Jan. 6-9, 1986 at Reno, Nev.

FIG. 4 shows a graph of $\Delta C_n$, where $C_n$ is the yawing moment coefficient, versus $\alpha$, the angle of attack, for the mode of operation in FIG. 3 for two different strake location angles and for a 30° rudder. Note that angles of attack above 20° the rudder begins to lose its effectiveness and at angles of attack above 40° the rudder becomes completely ineffective. Yet the strakes start to be effective at 20° and remain effective through 70°.

Figure 5:
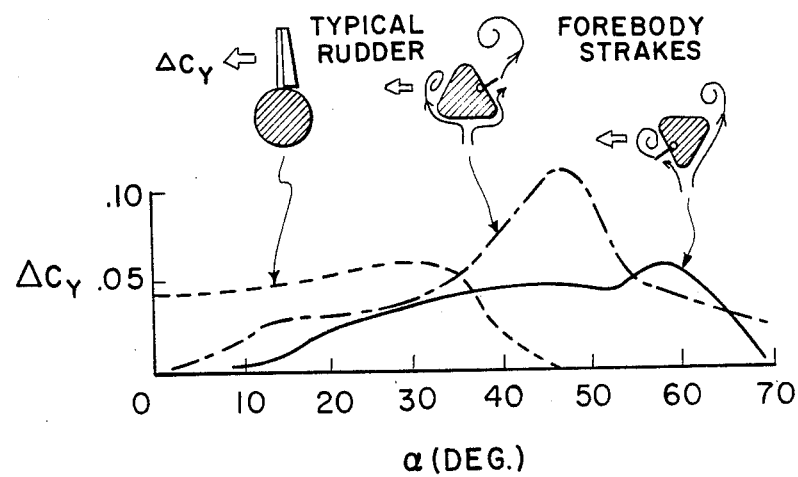
FIG. 5 is a graph demonstrating the yaw control of forebodies having triangular cross-sections.

A cross-section of forebody 12 as disclosed is circular; however, it can have different shaped cross-sections without detracting from this invention. For example, FIG. 5 discloses a graph of $\Delta C_y$, where $C_y$ is side force coefficient, versus angle of attack for a typical rudder and different triangular forebody orientations utilizing this invention. Note that at angles of attack above 40° when the rudder becomes ineffective the triangular shapes remain most effective.

Thus far a mode of operation has been described in which one strake is not deflected and the other strake is deflected through different angles to provide yaw control at high angles of attack. Another mode of operation is to initially deflect both strakes to some angle, say 0° (strakes are perpendicular to the forebody), however other angles can be used. Then the two strakes are deflected equally and anti-symmetrically as shown in FIG. 6. Both of the strakes 11 and 20 are shown being deflected counter-clockwise to produce a yaw force in one direction. If both of the strakes are deflected in the clockwise direction, a yaw force in the opposite direction will be produced. The term "anti-symmetrically controlling" as used in the claims is intended to cover both the mode of operation in FIG. 6 and the mode of operation in FIG. 3.

In a further mode of operation, both of the strakes 11 and 16 are deflected equally and symmetrically as shown in FIG. 7. That is, the two strakes are deflected in unison, one in the clockwise direction and the other in the counter-clockwise direction. This mode of operation varies the normal force on the forebody and thereby provides a pitch control without inducing a yawing moment.

Normally without strakes the vortex causes an unwanted yaw side force at high angles of attack due to an unsymmetrical vortex acting on the forebody. With the double strake modes of operation, the unwanted yaw forces are substantially reduced. That is, with the anti-symmetric deflections of the strakes in FIG. 6 and the symmetric deflections of the strakes in FIG. 7, the unwanted yaw side forces will be decreased.

Figure 8:
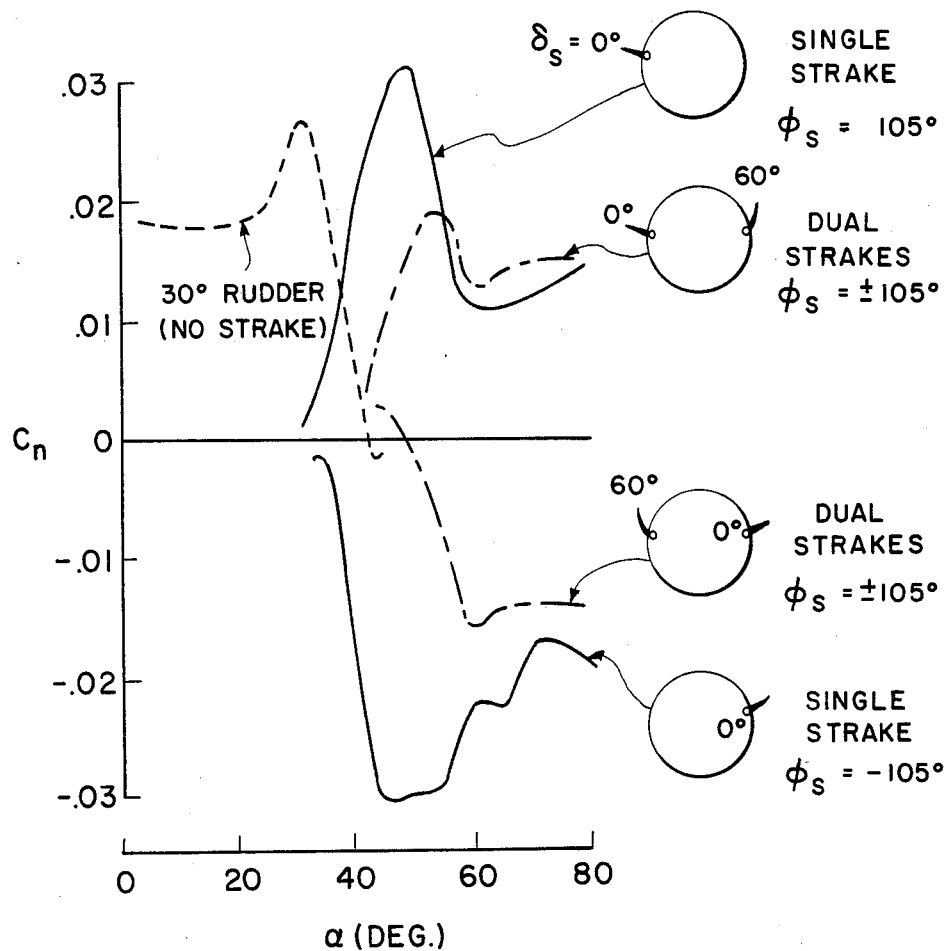
FIG. 8 is graphs demonstrating the yaw control of FIG. 2.

FIG. 8 is a graph of experimental results for a delta wing configuration as shown in FIG. 1 and with strake location angles of 105 degrees as shown in FIG. 2. Both single strake and dual strake operations are shown.

The advantages of this invention are that it provides a simple and easy to install yaw and pitch control for air vehicles at high angles of attack while avoiding the system complications of jet techniques. Also in the pitch control mode of operation the symmetrical strakes prevent side force development at high angles of attack.

Although a specific embodiment of the invention has been described herein, variations in the specific embodiment will be apparent to those skilled in the art in light of the above teachings without departing from the spirit and scope of the appended claims. For example, strake location angles greater than or less than 90° can be used. Although this invention has been disclosed with a delta wing configuration, it can be used with other configurations, for example a trapezoidal wing configuration without departing from the invention.

What is claimed is:

1. A method for controlling the yaw of an air vehicle, including a forebody which is the extended nose portion of the fuselage forward of the forward-most lifting surface of the air vehicle, at high angles of attack when the rudder of the air vehicle becomes ineffective comprising the steps of:

providing two symmetrically hinged conformal strakes on either side of the forebody of the air vehicle and with each hinged near the outer surface of the forebody at equal and opposite strake location angles for altering the flow separations and resulting vortex patterns around the forebody; and anti-symmetrically controlling the deflections of the two strakes to produce asymmetric vortex patterns around the forebody thereby producing yaw side forces on the forebody which provide yawing moments that are used as a yaw control for said air vehicle.

2. A method according to claim 1 wherein the step of anti-symmetrically controlling the deflections of the two strakes comprises conformally retaining one of the strakes and deflecting the other strake to provide yawing moments in one direction and retaining the said other strake and deflecting the said one strake to provide yawing moment in the other direction.

3. A method according to claim 1 wherein the step of anti-symmetrically controlling the deflections of the two strakes comprises initially symmetrically deflecting the two strakes through a selected angle and then anti-symmetrically deflecting the two strakes.

4. A method according to claim 1 including the step of symmetrically controlling the deflections of the two strakes to produce pitch side forces on the forebody which provide pitching moments that are used as a pitch control of said air vehicle.

5. Apparatus for controlling the yaw of an air vehicle at high angles of attack when the rudder becomes ineffective comprising:
- a forebody, included with said air vehicle, being the extended nose portion of the fuselage forward of the forward-most lifting surface of the air vehicle;
- a first strake means mounted at a selected strake location angle on one side of the forebody of said air vehicle by means of a first hinge such that the hinge line of the first hinge is near the surface of said forebody for altering the vortex pattern around said forebody;
- a second symmetrical strake means symmetrically mounted at said selected strake location angle on the opposite side of said forebody by means of a second hinge such that the hinge line of said second hinge is near the surface of said forebody for altering the vortex pattern around said forebody; and
- means for anti-symmetrically controlling the deflections of said first and second strake means to provide a yaw control of said air vehicle at high angles of attack.

6. Apparatus according to claim 5 wherein said means for anti-symmetrically controlling the deflections of said first and second strake means includes means for symmetrically controlling the deflections of said first and second strake means to provide a pitch control of said air vehicle at high angles of attack.

7. Apparatus according to claim 5 wherein said means for anti-symmetrically controlling the deflections of said first and second strake means comprises retaining one of the strake means and deflecting the other strake means to provide yawing moments in one direction and retaining the said other strake means and deflecting the said one strake means to provide yawing moments in the other direction.

8. Apparatus according to claim 5 wherein said means for anti-symmetrically controlling the deflections of said first and second strake means comprises anti-symmetrically deflecting the two strake means at the same time.

* * * * *